United States Patent [19]

Kanno et al.

[11] Patent Number: 4,978,578
[45] Date of Patent: * Dec. 18, 1990

[54] OPTICAL DISK OF POLYCARBONATE

[75] Inventors: Tatsuya Kanno; Ikuo Takahashi; Kenichi Sasaki, all of Himeji; Yoshihiro Iguchi, Tatsuno; Yutaka Fukuda, Himeji, all of Japan

[73] Assignee: Daicel Chemical Industries, Ltd., Sakai, Japan

[*] Notice: The portion of the term of this patent subsequent to May 16, 2006 has been disclaimed.

[21] Appl. No.: 225,052

[22] Filed: Jul. 27, 1988

[51] Int. Cl.$^5$ .................. B32B 27/36; C08G 63/62
[52] U.S. Cl. .................................. 428/412; 428/913; 528/204; 365/126
[58] Field of Search .......................... 428/412

[56] References Cited

U.S. PATENT DOCUMENTS 4,831,110  5/1989  Kanno et al. ............ 428/412

Primary Examiner—P. C. Sluby
Attorney, Agent, or Firm—Flynn, Thiel, Boutell & Tanis

[57] ABSTRACT

An optical disk of the invention comprises a substrate of an aromatic polycarbonate obtained by polymerizing one or two monomers polymerized through carbonate linkages and a recording layer coated thereon, said recording layer being recordable and readable by a laser beam, the monomer being selected from the group consisting of:
(a-1) 1,1'-bis-(4-hydroxyphenyl)-p-diisopropylbenzene
(a-2) 1,1'-bis-(4-hydroxyphenyl)-m-diisopropylbenzene,
(b-1) 2,2-bis-(4-hydroxyphenyl)propane,
(b-2) 2,2-bis-(4-hydroxyphenyl)butane,
(b-3) 2,2-bis-(4-hydroxyphenyl)-4-methylpentane,
(b-4) 2,2-bis-(4-hydroxyphenyl)octane,
(b-5) 1,1-bis-(4-hydroxyphenyl)cyclohexane,
(b-6) 4,4'-dihydroxy-2,2,2-triphenylethane,
(b-7) 2,2-bis-(4-hydroxy-3-methylphenyl)propane,
(b-8) 2,2-bis-(4-hydroxy-3-isopropylphenyl)propane,
(b-9) 2,2-bis-(4-hydroxy-3-sec.-butylphenyl)propane,
(b-10) 2,2-bis-(3,5-dimethyl-4-hydroxyphenyl)propane,
the polycarbonate being selected from the group consisting of:
(I) a copolymer of 3 to 97 mole percent of (a-1) and 97 to 3 mole percent of one of (b-1) to (b-10),
(II) a homopolymer of (a-1) and
(III) a copolymer of 3 to 97 mole percent of (a-2) and 97 to 3 mole percent of one of (b-1), (b-5), (b-6), (b-10) and (a-1).

7 Claims, No Drawings

OPTICAL DISK OF POLYCARBONATE

The invention relates to an optical information recording disk. Signals are recorded by means of a laser beam or recorded signals are read by utilizing the reflection or transmission of the laser beam.

A quite high recording density can be provided by an information recording/reproduction system of DRAW type or Erasable-DRAW-type in which a spot laser beam is applied to a disk to record signals on the disk by means of minute pits or the signals thus recorded by means of such pits are read by detecting the quantity of reflected or transmitted laser beam. Particularly in the system of Erasable-DRAW type, the record can be erased or written and images and sounds reproduced therefrom are excellent. Thus, it is expected to employ the system of ErasableDRAW type broadly in the recording of images and sounds or reproduction of them and in the recording/reproduction of a large quantity of information. The disk used in the recording/reproduction system must be not only transparent so as to transmit the laser beam through the disk body but also optically uniform so as to minimize an error in the readout. When the laser beam is transmitted through the disk body, double refraction occurs due to mainly a thermal stress caused in the cooling and flowing steps of a resin in the molding to form the disk body, and molecular orientation and residual stress caused by a change in volume around a glass transition point or temperature. A high optical non-uniformity due to the birefringence is a fatal defect of optical disks.

The birefringence of the disk taking place due to mainly the thermal stress caused in the cooling and flowing steps of a resin in the molding to form the disk body, molecular orientation and residual stress can be reduced considerably by selecting the molding conditions suitably. However, it still depends greatly on the intrinsic double refraction, i.e. photoelasticity constant, of the molded resin per se.

SUMMARY OF THE INVENTION

The birefringence can be represented as the product of the photoelastic coefficient and residual stress according to the following formula (1):

$$n_1 - n_2 = C(\sigma_1 - \sigma_2) \quad (1)$$

wherein:
$n_1 - n_2$ represents a birefringence,
$\sigma_1 - \sigma_2$ represents a residual stress, and
C represents a photoelastic coefficient It is apparent that the birefringence of the obtained disk can be reduced by reducing the photoelastic coefficient in the above formula (1) even when the molding conditions are unchanged.

The invention resides in use of a specified polycarbonate having a low photoelastic coefficient and high mechanical properties.

An optical disk of the invention comprises a substrate of an aromatic polycarbonate obtained by polymerizing one or two monomers polymerized through carbonate linkages and a recording layer coated thereon, the monomer being selected from the group consisting of:
(a-1) 1,1'-(4-hydroxyphenyl)-p-diisopropylbenzene
(a-2) 1,1'-bis-(4-hydroxyphenyl)-m-diisopropylbenzene,
(b-1) 2,2-bis-(4-hydroxyphenyl)propane,
(b-2) 2,2-bis-(4-hydroxyphenyl)butane,
(b-3) 2,2-bis-(4-hydroxyphenyl)-4-methylpentane,
(b-4) 2,2-bis-(4-hydroxyphenyl)octane,
(b-5) 1,1-bis-(4-hydroxyphenyl)cyclohexane,
(b-6) 4,4'-dihydroxy-2,2,2-triphenylethane,
(b-7) 2,2-bis-(4-hydroxy-3-methylphenyl)propane,
(b-8) 2,2-bis-(4-hydroxy-3-isopropylphenyl)propane,
(b-9) 2,2-bis-(4-hydroxy-3-sec.-butylphenyl)propane,
(b-10) 2,2-bis-(3,5-dimethyl-4-hydroxyphenyl)propane, the polycarbonate being selected from the group consisting of:
(I) a copolymer of 3 to 97 mole percent of (a-1) and 97 to 3 mole percent of one of (b-1) to (b-10),
(II) a homopolymer of (a-1) and
(III) a copolymer of 3 to 97 mole percent of (a-2) and 97 to 3 mole percent of one of (b-1), (-5), (b-6), (b-10) and (a-1).

It is preferable that the polycarbonate is a copolymer of (a-2) and (b-6).

The aromatic polycarbonate of the invention is useful as a starting material for an optical disk to record information with. The disk according to the invention includes the direct read after write type (DRAW) and the erasable direct read after write type (Erasable DRAW) and serves to record signals with a laser beam and read recorded signals with reflection or transmission of a laser beam.

From the practical point of view, the polycarbonate is used as a supporting substrate for a recording layer. A disk of it is covered with a recording layer such as evaporated metals to form a recording medium. Two recording disks obtained this way are assembled into one body, for example by bonding with an adhesive or melting and bonding with the ultrasonic waves, through a spacer so that the two recording surfaces may be faced to each other. The recording layer may be further covered with a protective layer.

The polycarbonate to use in the invention having a low photoelasticity constant can be used as a starting material for optical information recording disks wherein signals are recorded by a laser beam or recorded signals are read by utilizing the reflection or transmission of the laser beam.

The invention provides an optical disk with an unexpected improvement in view of a photoelasticity constant or birefringence and mechanical properties such as tensile strength, bending resistance and fluidity on moulding.

The polycarbonate of the invention has a decreased photoelastic coefficient, called also as a photoelasticity constant, and therefore is prevented from birefringence, called also as double refraction.

The polycarbonate to use in the invention will be explained below in detail It can be obtained by polymerizing one or two bisphenols. In the copolymer, a copolymerization molar ratio ranges from 3/97 to 97/3, preferable from 10/90 to 90/10. It is preferred to have a viscosity-average molecular weight of 13,000 to 50,000. It further comprises a third co-monomer.

In general, the polycarbonate has repeated units having the following formula.

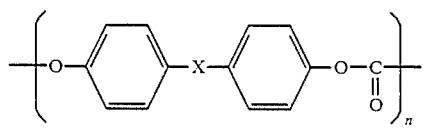

The bisphenols to use for the polycarbonate have the following formulae.

(a-1) 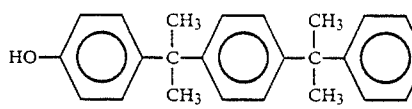

(a-2) 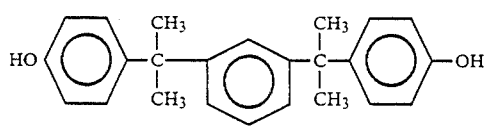

(b-1) 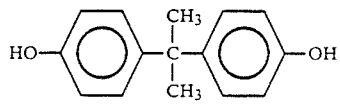

(b-2) 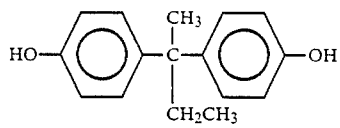

(b-3) 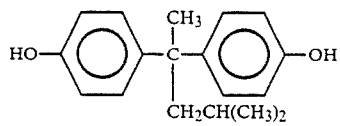

(b-4) 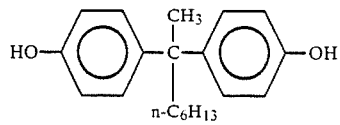

(b-5) 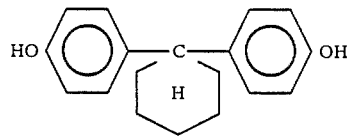

(b-6) 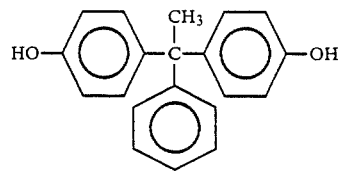

(b-7) 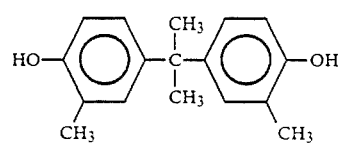

(b-8) 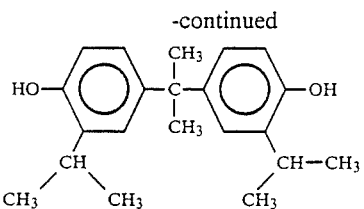

(b-9) 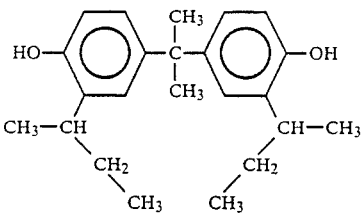

(b-10) 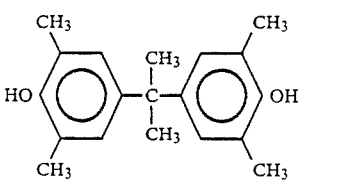

The polycarbonate to use in the invention can be prepared, for example, by the following two methods.

(1) Interesterification method

One or two monomers, for example, 4,4'-dihydroxy-2,2,2-triphenylethane and 1,1'-bis-(4-hydroxyphenyl)-m-diisopropylbenzene to obtain a polycarbonate of (a-2) and (b-6), are reacted with each other in the presence of diphenyl carbonate in an amount slightly larger than its stoichiometric amount and an ordinary carbonation catalyst at a temperature of about 160° to 180° C. under atmospheric pressure for about 30 min while an inert gas is introduced thereinto. Then, the pressure is reduced gradually over 2 or 3 hours to 10 Torr at about 180° to 220° C. to complete the precondensation reaction at 220° C. Then the reaction is continued at 270° C. under 10 Torr for 30 min and then at 270° C. under 5 Torr for 20 min. Thereafter the post-condensation reaction is conducted at 270° C. under a reduced pressure of lower than 0.5 Torr, preferably 0.3 to 0.1 Torr, for 1.5 to 2.0 h.

The catalyst for the carbonation to use in the invention includes alkali metal salts of lithium catalysts, potassium catalysts, sodium catalysts, calcium catalysts and tin catalysts and alkaline earth metal salts of these catalysts. Examples of them include lithium hydroxide, lithium carbonate, potassium borohydride, potassium hydrogenphosphate, sodium hydroxide, sodium borohydride, calcium hydride, dibutyltin oxide and stannous oxide. Among them, the potassium catalysts are preferred.

(2) Phosgene process:

A three-necked flask is provided with a stirrer, thermometer, gas-inlet tube and gas-outlet tube. One or two monomers, for example those shown above, are dissolved in pyridine and gaseous phosgene is introduced thereinto under vigorous stirring. This operation is conducted in a powerful draft chamber, since phosgene is virulent. A unit for decomposing excess phosgene into nonpoisonous compounds with a 10% aqueous sodium hydroxide solution is provided at an end of the outlet tube. Phosgene is introduced from a bomb into the flask through an empty gas washing bottle, a gas washing bottle containing paraffin (to count the number of bubbles) and an empty gas washing bottle sequentially. The gas inlet tube is inserted into the flask and placed above the stirrer and the end thereof is widened like a funnel so that it would not be clogged by the formed pyridine salt.

As the gas is introduced into the flask, pyridine hydrochloride is precipitated and the reaction mixture becomes turbid The reaction mixture is cooled with water to keep the reaction temperature below 30° C. As the condensation reaction proceeds, the reaction mixture becomes viscous. Phosgene is introduced thereinto until yellow color of phosgene/hydrogen chloride complex no more disappears. After completion of the reaction, methanol is added to precipitate the polymer, which is filtered and dried. The polycarbonate thus formed, being soluble in methylene chloride, pyridine, chloroform, tetrahydrofuran or the like, is dissolved therein and reprecipitated from methanol to purify the same.

EXAMPLE 1

174 parts by weight (50 molar %) of 4,4'-dihydroxy-2,2,2-triphenylethane, 208 parts by weight of 1,1'-bis(4-hydroxyphenyl)-m-diisopropyl benzene (50 molar %) and 264 parts by weight of diphenyl carbonate were placed in a 3 liter three-necked flask and, after repeating degasing and nitrogen purge five times, they were melted at 170° C. in a silicone bath while nitrogen was introduced thereinto. After the melting, a solution of potassium borohydride as a carbonation catalyst previously dissolved in phenol was added in an amount of $10^{-3}$ molar % based on the total amount of the supplied bisphenol and stirred at 170° C. under a nitrogen atmosphere for 30 min and aged. Then, after stirring at a reduced pressure of 100 Torr at that temperature for 30 min, the pressure was further reduced to 50 Torr at that temperature and the reaction was conducted for 30 min. Then, the temperature was slowly elevated to 220° C. and the reaction was conducted for 60 min and phenol until this reaction step was distilled out by an amount of 80% based on the theoretical distillation amount. Then, the pressure was reduced to 10 Torr at that temperature and the reaction was conducted for 30 min. Then, the temperature was elevated slowly to 270° C. and the reaction was conducted for 30 min. Further, pressure was reduced to 5 Torr at that temperature and the reaction was conducted for 30 min, and substantially the entire theoretical distillation amount of phenol was distilled out and the pre-condensation was thus completed Then, the post-condensation was conducted at that temperature under 0.1 to 0.3 Torr for 2 hours. The resulting polymer was taken out and cooled in a nitrogen atmosphere and, thereafter, the solution viscosity was measured at 20° C. by using dichloromethane as the solvent The viscosity-average molecular weight $\overline{M}v$ was 19500. By the measurement of DSC (differential scanning calorimeter), it was found that the glass transition point Tg was 131° C. The photoelasticity constant C was measured and it was found to be 61 Brewsters ($10^{-12}$ m²/N).

EXAMPLE 2

A three-necked flask was provided with a stirrer, a thermometer, gas-inlet tube and gas-outlet tube. 174 parts by weight of 4,4'-dihydroxy-2,2,2-triphenylethane and 208 parts by weight of 1,1'-bis-(4-hydroxyphenyl)-m-diisopropyl benzene were dissolved in dichloromethane. An aqueous 10 wt % solution of sodium hydroxide was added and gaseous phosgene was introduced under vigorous stirring. Phosgene was introduced from a bomb into the flask through an empty gas washing bottle, a gas washing bottle containing water and an empty gas washing bottle. The reaction temperature was kept below 25° C. by water cooling during the introduction of gaseous phosgene As the condensation reaction proceeded, the solution became viscous. Phosgene was further introduced until yellow color of phosgene/hydrogen chloride complex no more disappeared. After completion of the reaction, the reaction solution was poured into methanol, which was filtered and then washed with water repeatedly. The thus formed polycarbonate as a solution in dichloromethane was purified by reprecipitation from methanol. After the purification and thorough drying, the solution viscosity at 20° C. was measured using dichloromethane as the solvent. The viscosity-average molecular weight $\overline{M}v$ calculated from the measured value was 22000.

EXAMPLE 3

161 parts by weight (50 molar %) of 1,1'-bis-(4-hydroxyphenyl)cyclohexane, 208 parts by weight of 1,1'-bis-(4-hydroxyphenyl)-m-diisopropyl benzene (50 molar %) and 264 parts by weight of diphenyl carbonate were placed in a 3 liter three-necked flask and, after repeating degasing and nitrogen purge five times, they were melted at 160° C. in a silicone bath while nitrogen was introduced thereinto. After the melting, a solution of potassium borohydride as a carbonation catalyst previously dissolved in phenol was added in an amount of $10^{-3}$ molar % based on the total amount of the supplied bisphenol and stirred at 160° C. under a nitrogen atmosphere for 30 min and aged. Then, after stirring at a reduced pressure of 100 Torr at that temperature for 30 min, the pressure was further reduced to 50 Torr at that temperature and the reaction was conducted for 60 min. Then, the temperature was slowly elevated to 220° C. and the reaction was conducted for 60 min and phenol until this reaction step was distilled out by an amount of 80 % based on the theoretical distillation amount. Then, the pressure was reduced to 10 Torr at that temperature and the reaction was conducted for 30 min. Then, the temperature was elevated slowly to 270° C. and the reaction was conducted for 30 min. Further, pressure was reduced to 5 Torr at that temperature and the reaction was conducted for 30 min, and substantially the entire theoretical distillation amount of phenol was distilled out and the pre-condensation was thus completed. Then, the post-condensation was conducted at that temperature under 0.1 to 0.3 Torr for 2 hours. The resulting polymer was taken out and cooled in a nitrogen atmosphere and, thereafter, the solution viscosity was measured at 20° C. by using dichloromethane as the solvent The viscosity-average molecular weight $\overline{M}v$ was 18000.

EXAMPLE 4

A three-necked flask was provided with a stirrer, a thermometer, gas-inlet tube and gas-outlet tube. 161 parts by weight of 1,1'-bis-(4-hydroxyphenyl)cyclohexane and 208 parts by weight of 1,1'-bis-(4-hydroxyphenyl)-m-diisopropyl benzene were dissolved in dichloromethane. An aqueous 10 wt % solution of sodium hydroxide was added and gaseous phosgene was introduced under vigorous stirring. Phosgene was introduced from a bomb into the flask through an empty gas washing bottle, a gas washing bottle containing water and an empty gas washing bottle. The reaction temperature was kept below 25° C. by water cooling during the introduction of gaseous phosgene. As the condensation reaction proceeded, the solution became viscous. Phosgene was further introduced until yellow color of phosgene/hydrogen chloride complex no more disappeared. After completion of the reaction, the reaction solution was poured into methanol, which was filtered and then washed with water repeatedly. The thus formed polycarbonate as a solution in dichloromethane was purified by reprecipitation from methanol. After the purification and thorough drying, the solution viscosity at 20° C. was measured using dichloromethane as the solvent. The viscosity-average molecular weight $\overline{M}v$ calculated from the measured value was 20500.

EXAMPLE 5

164 parts by weight (60 molar %) of 2,2-bis-(4-hydroxyphenyl)propane, 166 parts by weight of 1,1'-bis(4-hydroxyphenyl)-m-diisopropyl benzene (40 molar %) and 264 parts by weight of diphenyl carbonate were placed in a 3 liter three-necked flask and, after repeating degasing and nitrogen purge five times, they were melted at 160° C. in a silicone bath while nitrogen was introduced thereinto. After the melting, a solution of potassium borohydride as a carbonation catalyst previously dissolved in phenol was added in an amount of $10^{-3}$ molar % based on the total amount of the supplied bisphenol and stirred at 160° C. under a nitrogen atmosphere for 30 min and aged. Then, after stirring at a reduced pressure of 100 Torr at that temperature for 30 min, the pressure was further reduced to 50 Torr at that temperature and the reaction was conducted for 30 min. Then, the temperature was slowly elevated to 220° C. and the reaction was conducted for 30 min and phenol until this reaction step was distilled out by an amount of 80% based on the theoretical distillation amount. Then, the pressure was reduced to 10 Torr at that temperature and the reaction was conducted for 30 min. Then, the temperature was elevated slowly to 270° C. and the reaction was conducted for 30 min. Further, pressure was reduced to 5 Torr at that temperature and the reaction was conducted for 30 min, and substantially the entire theoretical distillation amount of phenol was distilled out and the pre-condensation was thus completed. Then, the post-condensation was conducted at that temperature under 0.1 to 0.3 Torr for 2 hours The resulting polymer was taken out and cooled in a nitrogen atmosphere and, thereafter, the solution viscosity was measured at 20° C. by using dichloromethane as the solvent. The viscosity-average molecular weight $\overline{M}v$ was 21000. By the measurement of DSC (differential scanning calorimeter), it was found that the glass transition point Tg was 130° C. The photoelasticity constant C was measured and it was found to be 62 Brewsters ($10^{-12}$ m²/N).

EXAMPLE 6

A three-necked flask was provided with a stirrer, a thermometer, gas-inlet tube and gas-outlet tube. 164 parts by weight of 2,2-bis-(4-hydroxyphenyl)propane and 166 parts by weight of 1,1'-bis-(4-hydroxyphenyl)-m-diisopropyl benzene were dissolved in dichloromethane. An aqueous 10 wt % solution of sodium hydroxide was added and gaseous phosgene was introduced under vigorous stirring. Phosgene was introduced from a bomb into the flask through an empty gas washing bottle, a gas washing bottle containing water and an empty gas washing bottle The reaction temperature was kept below 25° C. by water cooling during the introduction of gaseous phosgene As the condensation reaction proceeded, the solution became viscous. Phosgene was further introduced until yellow color of phosgene/hydrogen chloride complex no more disappeared. After completion of the reaction, the reaction solution was poured into methanol, which was filtered and then washed with water repeatedly. The thus formed polycarbonate as a solution in dichloromethane was purified by reprecipitation from methanol. After the purification and thorough drying, the solution viscosity at 20° C. was measured using dichloromethane as the solvent. The viscosity-average molecular weight $\overline{M}v$ calculated from the measured value was 22000.

EXAMPLE 7

249 parts by weight (60 molar %) of 2,2-bis-(3,5-dimethyl-4-hydroxyphenyl)propane, 137 parts by weight of 1,1'-bis-(4-hydroxyphenyl)-m-diisopropyl benzene (40 molar %) and 265 parts by weight of diphenyl carbonate were placed in a 3 liter three-necked flask and, after repeating degasing and nitrogen purge five times, they were melted at 160° C. in a silicone bath while nitrogen was introduced thereinto. After the melting, a solution of potassium borohydride as a carbonation catalyst previously dissolved in phenol was added in an amount of $10^{-3}$ molar % based on the total amount of the supplied bisphenol and stirred at 160° C. under a nitrogen atmosphere for 30 min and aged. Then, after stirring at a reduced pressure of 100 Torr at that temperature for 30 min, the pressure was further reduced to 50 Torr at that temperature and the reaction was conducted for 60 min. Then, the temperature was slowly elevated to 220° C. and the reaction was conducted for 60 min and phenol until this reaction step was distilled out by an amount of 80% based on the theoretical distillation amount. Then, the pressure was reduced to 10 Torr at that temperature and the reaction was conducted for 30 min. Then, the temperature was elevated slowly to 270° C. and the reaction was conducted for 30 min. Further, pressure was reduced to 5 Torr at that temperature and the reaction was conducted for 30 min, and substantially the entire theoretical distillation amount of phenol was distilled out and the pre-condensation was thus completed. Then, the post-condensation was conducted at that temperature under 0.1 to 0.3 Torr for 2 hours. The resulting polymer was taken out and cooled in a nitrogen atmosphere and, thereafter, the solution viscosity was measured at 20° C. by using dichloromethane as the solvent. The viscosity-average molecular weight $\overline{M}v$ was 19700.

EXAMPLE 8

A three-necked flask was provided with a stirrer, a thermometer, gas-inlet tube and gas-outlet tube. 249 parts by weight of 2,2-bis-(3,5-dimethyl 4-hydroxyphenyl)propane and 137 parts by weight of 1,1'-bis-(4-hydroxyphenyl)-m-diisopropyl benzene were dissolved in dichloromethane. An aqueous 10 wt % solution of sodium hydroxide was added and gaseous phosgene was introduced under vigorous stirring. Phosgene was introduced from a bomb into the flask through an empty gas washing bottle, a gas washing bottle containing water and an empty gas washing bottle. The reaction temperature was kept below 25° C. by water cooling during the introduction of gaseous phosgene As the condensation reaction proceeded, the solution became viscous. Phosgene was further introduced until yellow color of phosgene/hydrogen chloride complex no more disappeared After completion of the reaction, the reaction solution was poured into methanol, which was filtered and then washed with water repeatedly. The thus formed polycarbonate as a solution in dichloromethane was purified by reprecipitation from methanol. After the purification and thorough drying, the solution viscosity at 20° C. was measured using dichloromethane as the solvent. The viscosity-average molecular weight $\overline{M}v$ calculated from the measured value was 21800.

EXAMPLE 9

208 parts by weight (50 molar %) of 1,1'-bis(4-hydroxyphenyl)-p-diisopropyl benzene, 208 parts by weight of 1,1'-bis(4-hydroxyphenyl)-m-diisopropyl benzene (50 molar %) and 264 parts by weight of diphenyl carbonate were placed in a 3 liter three-necked flask and, after repeating degasing and nitrogen purge five times, they were melted at 180° C. in a silicone bath while nitrogen was introduced thereinto. After the melting, a solution of potassium borohydride as a carbonation catalyst previously dissolved in phenol was added in an amount of $10^{-3}$ molar % based on the total amount of the supplied bisphenol and stirred at 180° C. under a nitrogen atmosphere for 30 min and aged. Then, after stirring at a reduced pressure of 100 Torr at that temperature for 30 min, the pressure was further reduced to 50 Torr at that temperature and the reaction was conducted for 30 min. Then, the temperature was slowly elevated to 220° C. and the reaction was conducted for 60 min and phenol until this reaction step was distilled out by an amount of 80% based on the theoretical distillation amount. Then, the pressure was reduced to 10 Torr at that temperature and the reaction was conducted for 30 min. Then, the temperature was elevated slowly to 270° C. and the reaction was conducted for 30 min, in which nearly the pressure was reduced to 5 Torr at that temperature and the reaction was conducted for 30 min. Substantially the entire theoretical distillation amount of phenol was distilled out and the pre-condensation was thus completed. Then, the post-condensation was conducted at that temperature under 0 1 to 0 3 Torr for 1.5 hours. The resulting polymer was taken out and cooled in a nitrogen atmosphere and, thereafter, the solution viscosity was measured at 20° C. by using dichloromethane as the solvent. The viscosity-average molecular weight $\overline{M}v$ was 20000. By the measurement of DSC (differential scanning calorimeter), it was found that the glass transition point Tg was 122° C. The photoelasticity constant C was measured and it was found to be 55 Brewsters ($10^{-12}$ m$^2$/N).

EXAMPLE 10

A three-necked flask was provided with a stirrer, a thermometer, gas-inlet tube and gas-outlet tube. 208 parts by weight of 1,1'-bis-(4-hydroxyphenyl)-p-diisopropyl benzene and 208 parts by weight of 1,1'-bis-(4-hydroxyphenyl)-m-diisopropyl benzene were dissolved in dichloromethane. An aqueous 10 wt % solution of sodium hydroxide was added and gaseous phosgene was introduced under vigorous stirring. Phosgene was introduced from a bomb into the flask through an empty gas washing bottle, a gas washing bottle containing water and an empty gas washing bottle. The reaction temperature was kept below 25° C. by water cooling during the introduction of gaseous phosgene. As the condensation reaction proceeded, the solution became viscous. Phosgene was further introduced until yellow color of phosgene/hydrogen chloride complex no more disappeared. After completion of the reaction, the reaction solution was poured into methanol, which was filtered and then washed with water repeatedly. The thus formed polycarbonate as a solution in dichloromethane was purified by reprecipitation from methanol After the purification and thorough drying, the solution viscosity at 20° C. was measured using dichloromethane as the solvent. The viscosity-average molecular weight $\overline{M}v$ calculated from the measured value was 21000.

EXAMPLE 11

208 parts by weight (50 molar %) of 1,1'-bis-(4-hydroxyphenyl)-p-diisopropyl benzene, 137 parts by weight of 2,2-bis-(4-hydroxyphenyl)propane (50 molar %) and 264 parts by weight of diphenyl carbonate were placed in a 3 liter three-necked flask and, after repeating degasing and nitrogen purge five times, they were melted at 170° C. in a silicone bath while nitrogen was introduced thereinto. After the melting, a solution of potassium borohydride as a carbonation catalyst previously dissolved in phenol was added in an amount of $10^{-3}$ molar % based on the total amount of the supplied bisphenol and stirred at 170° C. under a nitrogen atmosphere for 30 min and aged. Then, after stirring at a reduced pressure of 100 Torr at that temperature for 30 min, the pressure was further reduced to 50 Torr at that temperature and the reaction was conducted for 30 min. Then, the temperature was slowly elevated to 220° C. and the reaction was conducted for 60 min and phenol until this reaction step was distilled out by an amount of 80% based on the theoretical distillation amount. Then, the pressure was reduced to 10 Torr at that temperature and the reaction was conducted for 30 min. Then, the temperature was elevated slowly to 270° C. and the reaction was conducted for 30 min. Further, pressure was reduced to 5 Torr at that temperature and the reaction was conducted for 30 min, and substantially the entire theoretical distillation amount of phenol was distilled out and the pre-condensation was thus completed. Then, the post-condensation was conducted at that temperature under 0.1 to 0.3 Torr for 1.5 hours. The resulting polymer was taken out and cooled in a nitrogen atmosphere and, thereafter, the solution viscosity was measured at 20° C. by using dichloromethane as the solvent The viscosity-average molecular weight $\overline{M}v$ was 21400.

EXAMPLE 12

A three-necked flask was provided with a stirrer, a thermometer, gas-inlet tube and gas-outlet tube. 208 parts by weight of 1,1'-bis-(4-hydroxyphenyl)-p-diisopropyl benzene and 137 parts by weight of 2,2-bis-(4-hydroxyphenyl)propane were dissolved in dichloromethane. An aqueous 10 wt % solution of sodium hydroxide was added and gaseous phosgene was introduced under vigorous stirring Phosgene was introduced from a bomb into the flask through an empty gas washing bottle, a gas washing bottle containing water and an empty gas washing bottle. The reaction temperature was kept below 25° C. by water cooling during the introduction of gaseous phosgene. As the condensation reaction proceeded, the solution became viscous Phosgene was further introduced until yellow color of phosgene/hydrogen chloride complex no more disappeared. After completion of the reaction, the reaction solution was poured into methanol, which was filtered and then washed with water repeatedly. The thus formed polycarbonate as a solution in dichloromethane was purified by reprecipitation from methanol. After the purification and thorough drying, the solution viscosity at 20° C. was measured using dichloromethane as the solvent. The viscosity-average molecular weight $\overline{M}v$ calculated from the measured value was 22700.

EXAMPLE 13

208 parts by weight (50 molar %) of 1,1'-bis-(4-hydroxyphenyl)-p-diisopropyl benzene, 145 parts by weight of 2,2-bis-(4-hydroxyphenyl)butane (50 molar %) and 264 parts by weight of diphenyl carbonate were placed in a 3 liter three-necked flask and, after repeating degasing and nitrogen purge five times, they were melted at 170° C. in a silicone bath while nitrogen was introduced thereinto. After the melting, a solution of potassium borohydride as a carbonation catalyst previously dissolved in phenol was added in an amount of $10^{-3}$ molar % based on the total amount of the supplied bisphenol and stirred at 170° C. under a nitrogen atmosphere for 30 min and aged. Then, after stirring at a reduced pressure of 100 Torr at that temperature for 30 min, the pressure was further reduced to 50 Torr at that temperature and the reaction was conducted for 30 min. Then, the temperature was slowly elevated to 220° C. and the reaction was conducted for 60 min and phenol until this reaction step was distilled out by an amount of 80% based on the theoretical distillation amount. Then, the pressure was reduced to 10 Torr at that temperature and the reaction was conducted for 30 min. Then, the temperature was elevated slowly to 270° C. and the reaction was conducted for 30 min. Further, pressure was reduced to 5 Torr at that temperature and the reaction was conducted for 30 min, and substantially the entire theoretical distillation amount of phenol was distilled out and the pre-condensation was thus completed. Then, the post-condensation was conducted at that temperature under 0.1 to 0.3 Torr for 1.5 hours. The resulting polymer was taken out and cooled in a nitrogen atmosphere and, thereafter, the solution viscosity was measured at 20° C. by using dichloromethane as the solvent The viscosity-average molecular weight $\overline{M}v$ was 20600.

EXAMPLE 14

A three-necked flask was provided with a stirrer, a thermometer, gas-inlet tube and gas-outlet tube. 208 parts by weight of 1,1'-bis-(4-hydroxyphenyl)-p-diisopropyl benzene and 145 parts by weight of 2,2-bis-(4-hydroxyphenyl)butane were dissolved in dichloromethane. An aqueous 10 wt % solution of sodium hydroxide was added and gaseous phosgene was introduced under vigorous stirring. Phosgene was introduced from a bomb into the flask through an empty gas washing bottle, a gas washing bottle containing water and an empty gas washing bottle. The reaction temperature was kept below 25° C. by water cooling during the introduction of gaseous phosgene. As the condensation reaction proceeded, the solution became viscous. Phosgene was further introduced until yellow color of phosgene/hydrogen chloride complex no more disappeared. After completion of the reaction, the reaction solution was poured into methanol, which was filtered and then washed with water repeatedly. The thus formed polycarbonate as a solution in dichloromethane was purified by reprecipitation from methanol. After the purification and thorough drying, the solution viscosity at 20° C. was measured using dichloromethane as the solvent. The viscosity-average molecular weight $\overline{M}v$ calculated from the measured value was 21800.

EXAMPLE 15

208 parts by weight (50 molar %) of 1,1'-bis-(4-hydroxyphenyl)-p-diisopropyl benzene, 162 parts by weight of 2,2-bis-(4-hydroxyphenyl)-4-methylpentane(50 molar %) and 264 parts by weight of diphenyl carbonate were placed in a 3 liter three-necked flask and, after repeating degasing and nitrogen purge five times, they were melted at 170° C. in a silicone bath while nitrogen was introduced thereinto. After the melting, a solution of potassium borohydride as a carbonation catalyst previously dissolved in phenol was added in an amount of $10^{-3}$ molar % based on the total amount of the supplied bisphenol and stirred at 160° C. under a nitrogen atmosphere for 30 min and aged. Then, after stirring at a reduced pressure of 100 Torr at that temperature for 30 min, the pressure was further reduced to 50 Torr at that temperature and the reaction was conducted for 30 min. Then, the temperature was slowly elevated to 220° C. and the reaction was conducted for 60 min and phenol until this reaction step was distilled out by an amount of 80% based on the theoretical distillation amount. Then, the pressure was reduced to 10 Torr at that temperature and the reaction was conducted for 30 min. Then, the temperature was elevated slowly to 270° C. and the reaction was conducted for 30 min. Further, pressure was reduced to 5 Torr at that temperature and the reaction was conducted for 30 min, and substantially the entire theoretical distillation amount of phenol was distilled out and the pre-condensation was thus completed. Then, the post-condensation was conducted at that temperature under 0.1 to 0.3 Torr for 1.5 hours. The resulting polymer was taken out and cooled in a nitrogen atmosphere and, thereafter, the solution viscosity was measured at 20° C. by using dichloromethane as the solvent. The viscosity-average molecular weight $\overline{M}v$ was 20200.

EXAMPLE 16

A three-necked flask was provided with a stirrer, a thermometer, gas-inlet tube and gas-outlet tube 208 parts by weight of 1,1'-bis-(4-hydroxyphenyl)-p-diisopropyl benzene and 162 parts by weight of 2,2-bis-(4-hydroxyphenyl)-4-methylpentane were dissolved in dichloromethane. An aqueous 10 Wt % solution of sodium hydroxide was added and gaseous phosgene was introduced under vigorous stirring. Phosgene was introduced from a bomb into the flask through an empty gas washing bottle, a gas washing bottle containing water and an empty gas washing bottle. The reaction temperature was kept below 25° C. by water cooling during the introduction of gaseous phosgene. As the condensation reaction proceeded, the solution became viscous. Phosgene was further introduced until yellow color of phosgene/hydrogen chloride complex no more disappeared. After completion of the reaction, the reaction solution was poured into methanol, which was filtered and then washed with water repeatedly. The thus formed polycarbonate as a solution in dichloromethane was purified by reprecipitation from methanol. After the purification and thorough drying, the solution viscosity at 20° C. was measured using dichloromethane as the solvent The viscosity-average molecular weight $\overline{M}v$ calculated from the measured value was 22000.

EXAMPLE 17

208 parts by weight (50 molar %) of 1,1'-bis-(4-hydroxyphenyl)-p-diisopropyl benzene, 179 parts by weight of 2,2-bis-(4-hydroxyphenyl)octane (50 molar %) and 264 parts by weight of diphenyl carbonate were placed in a 3 liter three-necked flask and, after repeating degasing and nitrogen purge five times, they were melted at 170° C. in a silicone bath while nitrogen was introduced thereinto. After the melting, a solution of potassium borohydride as a carbonation catalyst previously dissolved in phenol was added in an amount of $10^{-3}$ molar % based on the total amount of the supplied bisphenol and stirred at 170° C. under a nitrogen atmosphere for 30 min and aged. Then, after stirring at a reduced pressure of 100 Torr at that temperature for 30 min, the pressure was further reduced to 50 Torr at that temperature and the reaction was conducted for 30 min. Then, the temperature was slowly elevated to 220° C. and the reaction was conducted for 60 min and phenol until this reaction step was distilled out by an amount of 80% based on the theoretical distillation amount. Then, the pressure was reduced to 10 Torr at that temperature and the reaction was conducted for 30 min. Then, the temperature was elevated slowly to 270° C. and the reaction was conducted for 30 min. Further, pressure was reduced to 5 Torr at that temperature and the reaction was conducted for 30 min, and substantially the entire theoretical distillation amount of phenol was distilled out and the pre-condensation was thus completed. Then, the post-condensation was conducted at that temperature under 0.1 to 0.3 Torr for 1.5 hours. The resulting polymer was taken out and cooled in a nitrogen atmosphere and, thereafter, the solution viscosity was measured at 20° C. by using dichloromethane as the solvent The viscosity-average molecular weight $\overline{M}v$ was 19500.

EXAMPLE 18

A three-necked flask was provided with a stirrer, a thermometer, gas-inlet tube and gas-outlet tube. 208 parts by weight of 1,1'-bis-(4-hydroxyphenyl)-p-diisopropyl benzene and 179 parts by weight of 2,2-bis-(4-hydroxyphenyl)octane were dissolved in dichloromethane. An aqueous 10 wt % solution of sodium hydroxide was added and gaseous phosgene was introduced under vigorous stirring. Phosgene was introduced from a bomb into the flask through an empty gas washing bottle, a gas washing bottle containing water and an empty gas washing bottle The reaction temperature was kept below 25° C. by water cooling during the introduction of gaseous phosgene is the condensation reaction proceeded, the solution became viscous Phosgene was further introduced until yellow color of phosgene/hydrogen chloride complex no more disappeared. After completion of the reaction, the reaction solution was poured into methanol, which was filtered and then washed with water repeatedly. The thus formed polycarbonate as a solution in dichloromethane was purified by reprecipitation from methanol. After the purification and thorough drying, the solution viscosity at 20° C. was measured using dichloromethane as the solvent. The viscosity-average molecular weight $\overline{M}v$ calculated from the measured value was 22000.

EXAMPLE 19

250 parts by weight (60 molar %) of 1,1'-bis-(4-hydroxyphenyl)-p-diisopropyl benzene, 129 parts by weight (40 molar %) of 1,1-bis-(4-hydroxyphenyl)cyclohexane and 265 parts by weight of diphenyl carbonate were placed in a 3 liter three-necked flask and, after repeating degasing and nitrogen purge five times, they were melted at 180° C. in a silicone bath while nitrogen was introduced thereinto. After the melting, a solution of potassium borohydride as a carbonation catalyst previously dissolved in phenol was added in an amount of $10^{-3}$ molar % based on the total amount of the supplied bisphenol and stirred at 180° C. under a nitrogen atmosphere for 30 min and aged. Then, after stirring at a reduced pressure of 100 Torr at that temperature for 30 min, the pressure was further reduced to 50 Torr at that temperature and the reaction was conducted for 60 min. Then, the temperature was slowly elevated to 220° C. and the reaction was conducted for 60 min and phenol until this reaction step was distilled out by an amount of 80% based on the theoretical distillation amount. Then, the pressure was reduced to 10 Torr at that temperature and the reaction was conducted for 30 min. Then, the temperature was elevated slowly to 270° C. and the reaction was conducted for 30 min. Further, pressure was reduced to 5 Torr at that temperature and the reaction was conducted for 30 min, and substantially the entire theoretical distillation amount of phenol was distilled out and the pre-condensation was thus completed Then, the post-condensation was conducted at that temperature under 0.1 to 0.3 Torr for 2 hours The resulting polymer was taken out and cooled in a nitrogen atmosphere and, thereafter, the solution viscosity was measured at 20° C. by using dichloromethane as the solvent The viscosity-average molecular weight $\overline{M}v$ was 19200.

EXAMPLE 20

A three-necked flask was provided with a stirrer, a thermometer, gas-inlet tube and gas-outlet tube. 250 parts by weight of 1,1'-bis-(4-hydroxyphenyl)-p-diisopropyl benzene and 129 parts by weight of 1,1-bis-(4-hydroxyphenyl)-cyclohexane were dissolved in dichloromethane An aqueous 10 wt % solution of sodium hydroxide was added and gaseous phosgene was introduced under vigorous stirring Phosgene was introduced from a bomb into the flask through an empty gas washing bottle, a gas washing bottle containing water and an empty gas washing bottle. The reaction temperature was kept below 25° C. by water cooling during the introduction of gaseous phosgene As the condensation reaction proceeded, the solution became viscous. Phosgene was further introduced until yellow color of phosgene/hydrogen chloride complex no more disappeared. After completion of the reaction, the reaction solution was poured into methanol, which was filtered and then washed with water repeatedly. The thus formed polycarbonate as a solution in dichloromethane was purified by reprecipitation from methanol. After the purification and thorough drying, the solution viscosity at 20° C. was measured using dichloromethane as the solvent. The viscosity-average molecular weight $\overline{M}v$ calculated from the measured value was 20500.

EXAMPLE 21

208 parts by weight (50 molar %) of 1,1'-bis-(4-hydroxyphenyl)-p-diisopropyl benzene, 174 parts by weight (50 molar %) of 4,4-bis-dihydroxy-2,2,2-triphenylethane and 264 parts by weight of diphenyl carbonate were placed in a 3 liter three-necked flask and, after repeating degasing and nitrogen purge five times, they were melted at 180° C. in a silicone bath while nitrogen was introduced thereinto. After the melting, a solution of potassium borohydride as a carbonation catalyst previously dissolved in phenol was added in an amount of $10^{-3}$ molar % based on the total amount of the supplied bisphenol and stirred at 180° C. under a nitrogen atmosphere for 30 min and aged. Then, after stirring at a reduced pressure of 100 Torr at that temperature for 30 min, the pressure was further reduced to 50 Torr at that temperature and the reaction was conducted for 30 min. Then, the temperature was slowly elevated to 220° C. and the reaction was conducted for 60 min and phenol until this reaction step was distilled out by an amount of 80% based on the theoretical distillation amount. Then, the pressure was reduced to 10 Torr at that temperature and the reaction was conducted for 30 min. Then, the temperature was elevated slowly to 270° C. and the reaction was conducted for 30 min. Further, pressure was reduced to 5 Torr at that temperature and the reaction was conducted for 30 min, and substantially the entire theoretical distillation amount of phenol was distilled out and the pre-condensation was thus completed. Then, the post-condensation was conducted at that temperature under 0.1 to 0.3 Torr for 1.5 hours. The resulting polymer was taken out and cooled in a nitrogen atmosphere and, thereafter, the solution viscosity was measured at 20° C. by using dichloromethane as the solvent. The viscosity-average molecular weight $\overline{M}v$ was 19600.

EXAMPLE 22

A three-necked flask was provided with a stirrer, a thermometer, gas-inlet tube and gas-outlet tube. 208 parts by weight of 1,1'-bis-(4-hydroxyphenyl)-p-diisopropyl benzene and 174 parts by weight of 4,4-bis-dihydroxy-2,2,2-triphenylethane were dissolved in dichloromethane. An aqueous 10 wt % solution of sodium hydroxide was added and gaseous phosgene was introduced under vigorous stirring. Phosgene was introduced from a bomb into the flask through an empty gas washing bottle, a gas washing bottle containing water and an empty gas washing bottle. The reaction temperature was kept below 25° C. by water cooling during the introduction of gaseous phosgene As the condensation reaction proceeded, the solution became viscous. Phosgene was further introduced until yellow color of phosgene/hydrogen chloride complex no more disappeared. After completion of the reaction, the reaction solution was poured into methanol, which was filtered and then washed with water repeatedly. The thus formed polycarbonate as a solution in dichloromethane was purified by reprecipitation from methanol. After the purification and thorough drying, the solution viscosity at 20° C. was measured using dichloromethane as the solvent The viscosity-average molecular weight $\overline{M}v$ calculated from the measured value was 20800.

Example 23

208 parts by weight (50 molar %) of 1,1'-bis-(4-hydroxyphenyl)-p-diisopropyl benzene, 154 parts by weight (50 molar %) of 2,2-bis-(4-hydroxy-3-methylphenyl)propane and 264 parts by weight of diphenyl carbonate were placed in a 3 liter three-necked flask and, after repeating degasing and nitrogen purge five times, they were melted at 160° C. in a silicone bath while nitrogen was introduced thereinto. After the melting, a solution of potassium borohydride as a carbonation catalyst previously dissolved in phenol was added in an amount of $10^{-3}$ molar % based on the total amount of the supplied bisphenol and stirred at 160° C. under a nitrogen atmosphere for 30 min and aged. Then, after stirring ut a reduced pressure of 100 Torr at that temperature for 30 min, the pressure was further reduced to 50 Torr at that temperature and the reaction was conducted for 30 min. Then, the temperature was slowly elevated to 220° C. and the reaction was conducted for 60 min and phenol until this reaction step was distilled out by an amount of 80% based on the theoretical distillation amount. Then, the pressure was reduced to 10 Torr at that temperature and the reaction was conducted for 30 min. Then, the temperature was elevated slowly to 270° C. and the reaction was conducted for 30 min. Further, pressure was reduced to 5 Torr at that temperature and the reaction was conducted for 30 min, and substantially the entire theoretical distillation amount of phenol was distilled out and the pre-condensation was thus completed Then, the post-condensation was conducted at that temperature under 0.1 to 0.3 Torr for 1.5 hours. The resulting polymer was taken out and cooled in a nitrogen atmosphere and, thereafter, the solution viscosity was measured at 20° C. by using dichloromethane as the solvent The viscosity-average molecular weight $\overline{M}v$ was 20600.

EXAMPLE 24

A three-necked flask was provided with a stirrer, a thermometer, gas-inlet tube and gas-outlet tube. 208 parts by weight of 1,1'-bis-(4-hydroxyphenyl)-p-diisopropyl benzene and 154 parts by weight of 2,2-bis-(4-hydroxy-3-methylphenyl) propane were dissolved in dichloromethane. An aqueous 10 wt % solution of sodium hydroxide was added and gaseous phosgene was introduced under vigorous stirring. Phosgene was introduced from a bomb into the flask through an empty gas washing bottle, a gas washing bottle containing water and an empty gas washing bottle The reaction temperature was kept below 25° C. by water cooling during the introduction of gaseous phosgene. As the condensation reaction proceeded, the solution became viscous Phosgene was further introduced until yellow color of phosgene/hydrogen chloride complex no more disappeared. After completion of the reaction, the reaction solution was poured into methanol, which was filtered and then washed with water repeatedly. The thus formed polycarbonate as a solution in dichloromethane was purified by reprecipitation from methanol. After the purification and thorough drying, the solution viscosity at 20° C. was measured using dichloromethane as the solvent. The viscosity-average molecular weight $\overline{M}v$ calculated from the measured value was 21800.

EXAMPLE 25

208 parts by weight (50 molar %) of 1,1'-bis-(4-hydroxyphenyl)-p-diisopropyl benzene, 187 parts by weight (50 molar %) of 2,2-bis-(4-hydroxy-3-isopropylphenyl)propane and 264 parts by weight of diphenyl carbonate were placed in a 3 liter three-necked flask and, after repeating degasing and nitrogen purge five times, they were melted at 160° C. in a silicone bath while nitrogen was introduced thereinto. After the melting, a solution of potassium borohydride as a carbonation catalyst previously dissolved in phenol was added in an amount of $10^{-3}$ molar % based on the total amount of the supplied bisphenol and stirred at 160° C. under a nitrogen atmosphere for 30 min and aged. Then, after stirring at a reduced pressure of 100 Torr at that temperature for 30 min, the pressure was further reduced to 50 Torr at that temperature and the reaction was conducted for 30 min. Then, the temperature was slowly elevated to 220° C. and the reaction was conducted for 60 min and phenol until this reaction step was distilled out by an amount of 80% based on the theoretical distillation amount. Then, the pressure was reduced to 10 Torr at that temperature and the reaction was conducted for 30 min. Then, the temperature was elevated slowly to 270° C. and the reaction was conducted for 40 min. Further, pressure was reduced to 5 Torr at that temperature and the reaction was conducted for 40 min, and substantially the entire theoretical distillation amount of phenol was distilled out and the pre-condensation was thus completed. Then, the post-condensation was conducted at that temperature under 0.1 to 0.3 Torr for 2 hours. The resulting polymer was taken out and cooled in a nitrogen atmosphere and, thereafter, the solution viscosity was 20° C. by using dichloromethane as the solvent. The viscosity-average molecular weight $\overline{M}v$ was 22000.

EXAMPLE 26

A three-necked flask was provided with a stirrer, a thermometer, gas-inlet tube and gas-outlet tube. 208 parts by weight of 1,1'-bis-(4-hydroxyphenyl)-p-diisopropyl benzene and 187 parts by weight of 2,2-bis-(4-hydroxy-3-isopropylphenyl)propane were dissolved in dichloromethane. An aqueous 10 wt % solution of sodium hydroxide was added and gaseous phosgene was introduced under vigorous stirring. Phosgene was introduced from a bomb into the flask through an empty gas washing bottle, a gas washing bottle containing water and an empty gas washing bottle. The reaction temperature was kept below 25° C. by water cooling during the introduction of gaseous phosgene. As the condensation reaction proceeded, the solution became viscous Phosgene was further introduced until yellow color of phosgene/hydrogen chloride complex no more disappeared. After completion of the reaction, the reaction solution was poured into methanol, which was filtered and then washed with water repeatedly. The thus formed polycarbonate as a solution in dichloromethane was purified by reprecipitation from methanol. After the purification and thorough drying, the solution viscosity at 20° C. was measured using dichloromethane as the solvent. The viscosity-average molecular weight $\overline{M}v$ calculated from the measured value was 22700.

EXAMPLE 27

208 parts by weight (50 molar %) of 1,1'-bis-(4-hydroxyphenyl)-p-diisopropyl benzene, 204 parts by weight (50 molar %) of 2,2-bis-(4-hydroxy-3-sec-butylphenyl)propane and 264 parts by weight of diphenyl carbonate were placed in a 3 liter three-necked flask and, after repeating degasing and nitrogen purge five times, they were melted at 160° C. in a silicone bath while nitrogen was introduced thereinto. After the melting, a solution of potassium borohydride as a carbonation catalyst previously dissolved in phenol was added in an amount of $10^{-3}$ molar % based on the total amount of the supplied bisphenol and stirred at 160° C. under a nitrogen atmosphere for 30 min and aged. Then, after stirring at a reduced pressure of 100 Torr at that temperature for 30 min, the pressure was further reduced to 50 Torr at that temperature and the reaction was conducted for 60 min. Then, the temperature was slowly elevated to 220° C. and the reaction was conducted for 60 min and phenol until this reaction step was distilled out by an amount of 80% based on the theoretical distillation amount. Then, the pressure was reduced to 10 Torr at that temperature and the reaction was conducted for 30 min. Then, the temperature was elevated slowly to 270° C. and the reaction was conducted for 30 min. Further, pressure was reduced to 5 Torr at that temperature and the reaction was conducted for 30 min, and Substantially the entire theoretical distillation amount of phenol was distilled out and the pre-condensation was thus completed. Then, the post-condensation was conducted at that temperature under 0.1 to 0.3 Torr for 2 hours. The resulting polymer was taken out and cooled in a nitrogen atmosphere and, thereafter, the solution viscosity was measured at 20° C. by using dichloromethane as the solvent The viscosity-average molecular weight $\overline{M}v$ was 21000.

EXAMPLE 28

A three-necked flask was provided with a stirrer, a thermometer, gas-inlet tube and gas-outlet tube. 208 parts by weight of 1,1'-bis-(4-hydroxyphenyl)-p-diisopropyl benzene and 204 parts by weight of 2,2-bis-(4-hydroxy-3-sec-butylphenyl)propane were dissolved in dichloromethane. An aqueous 10 wt % solution of sodium hydroxide was added and gaseous phosgene was introduced under vigorous stirring. Phosgene was introduced from a bomb into the flask through an empty gas washing bottle, a gas washing bottle containing water and an empty gas washing bottle The reaction temperature was kept below 25° C. by water cooling during the introduction of gaseous phosgene As the condensation reaction proceeded, the solution became viscous. Phosgene was further introduced until yellow color of phosgene/hydrogen chloride complex no more disappeared. After completion of the reaction, the reaction solution was poured into methanol, which was filtered and then washed with water repeatedly. The thus formed polycarbonate as a solution in dichloromethane was purified by reprecipitation from methanol. After the purification and thorough drying, the solution viscosity at 20° C. was measured using dichloromethane as the solvent. The viscosity-average molecular weight $\overline{M}v$ calculated from the measured value was 21900.

EXAMPLE 29

208 parts by weight (50 molar %) of 1,1'-bis-(4-hydroxyphenyl)-p-diisopropyl benzene, 171 parts by weight (50 molar %) of 2,2-bis-(3,5-dimethyl-4-hydroxyphenyl)propane and 264 parts by weight of diphenyl carbonate were placed in a 3 liter three-necked flask and, after repeating degasing and nitrogen purge five times, they were melted at 180° C. in a silicone bath while nitrogen was introduced thereinto. After the melting, a solution of potassium borohydride as a carbonation catalyst previously dissolved in phenol was added in an amount of $2 \times 10^{-3}$ molar % based on the total amount of the supplied bisphenol and stirred at 180° C. under a nitrogen atmosphere for 30 min and aged. Then, after stirring at a reduced pressure of 100 Torr at that temperature for 30 min, the pressure was further reduced to 50 Torr at that temperature and the reaction was conducted for 60 min. Then, the temperature was slowly elevated to 220° C. and the reaction was conducted for 30 min and phenol until this reaction step was distilled out by an amount of 80% based on the theoretical distillation amount. Then, the pressure was reduced to 10 Torr at that temperature and the reaction was conducted for 30 min. Then, the temperature was elevated slowly to 270° C. and the reaction was conducted for 30 min. Further, pressure was reduced to 5 Torr at that temperature and the reaction was conducted for 60 min, and substantially the entire theoretical distillation amount of phenol was distilled out and the pre-condensation was thus completed. Then, the post-condensation was conducted at that temperature under 0.1 to 0.3 Torr for 2 hours. The resulting polymer was taken out and cooled in a nitrogen atmosphere and, thereafter, the solution viscosity was measured at 20° C. by using dichloromethane as the solvent The viscosity-average molecular weight $\overline{M}v$ was 20500.

EXAMPLE 30

A three-necked flask was provided with a stirrer, a thermometer, gas-inlet tube and gas-outlet tube. 208 parts by weight of 1,1'-bis-(4-hydroxyphenyl)-p-diisopropyl benzene and 171 parts by weight of 2,2-bis-(3,5-dimethyl-4-hydroxyphenyl)propane were dissolved in dichloromethane. An aqueous 10 wt % solution of sodium hydroxide was added and gaseous phosgene was introduced under vigorous stirring. Phosgene was introduced from a bomb into the flask through an empty gas washing bottle, a gas washing bottle containing water and an empty gas washing bottle The reaction temperature was kept below 25° C. by water cooling during the introduction of gaseous phosgene As the condensation reaction proceeded, the solution became viscous Phosgene was further introduced until yellow color of phosgene/hydrogen chloride complex no more disappeared. After completion of the reaction, the reaction solution was poured into methanol, which was filtered and then washed with water repeatedly. The thus formed polycarbonate as a solution in dichloromethane was purified by reprecipitation from methanol. After the purification and thorough drying, the solution viscosity at 20° C. was measured using dichloromethane as the solvent. The viscosity-average molecular weight $\overline{M}v$ calculated from the measured value was 22000.

EXAMPLE 31

416 parts by weight of 1,1'-bis-(4-hydroxyphenyl)-p-diisopropyl benzene and 264 parts by weight of diphenyl carbonate were placed in a 3 liter three-necked flask and, after repeating degasing and nitrogen purge five times, they were melted at 160° C. in a silicone bath while nitrogen was introduced thereinto. After the melting, a solution of potassium borohydride as a carbonation catalyst previously dissolved in phenol was added in an amount of $10^{-3}$ molar % based on the total amount of the supplied bisphenol and stirred at 160° C. under a nitrogen atmosphere for 30 min and aged. Then, after stirring at a reduced pressure of 100 Torr at that temperature for 30 min, the pressure was further reduced to 50 Torr at that temperature and the reaction was conducted for 30 min. Then, the temperature was slowly elevated to 220° C. and the reaction was conducted for 30 min and phenol until this reaction step was distilled out by an amount of 80% based on the theoretical distillation amount. Then, the pressure was reduced to 10 Torr at that temperature and the reaction was conducted for 30 min. Then, the temperature was elevated slowly to 270° C. and the reaction was conducted for 30 min. Further, pressure was reduced to 5 Torr at that temperature and the reaction was conducted for 60 min, and substantially the entire theoretical distillation amount of phenol was distilled out and the pre-condensation was thus completed. Then, the post-condensation was conducted at that temperature under 0.1 to 0.3 Torr for 2 hours. Then, the post-condensation was conducted at that temperature under 0.1 to 0.3 Torr for 2 hours. The resulting polymer was taken out and cooled in a nitrogen atmosphere and, thereafter, the solution viscosity was measured at 20° C. by using dichloromethane as the solvent. The viscosity-average molecular weight $\overline{M}v$ was 20000.

EXAMPLE 32

A three-necked flask was provided with a stirrer, a thermometer, gas-inlet tube and gas-outlet tube 416 parts by weight of 1,1'-bis-(4-hydroxyphenyl)-p-diisopropyl benzene was dissolved in dichloromethane. An aqueous 10 wt % solution of sodium hydroxide was added and gaseous phosgene was introduced under vigorous stirring Phosgene was introduced from a bomb into the flask through an empty gas washing bottle, a gas washing bottle containing water and an empty gas washing bottle The reaction temperature was kept below 25° C. by water cooling during the introduction of gaseous phosgene. As the condensation reaction proceeded, the solution became viscous Phosgene was further introduced until yellow color of phosgene/hydrogen chloride complex no more disappeared. After completion of the reaction, the reaction solution was poured into, methanol, which was filtered and then washed with water repeatedly. The thus formed polycarbonate as a solution in dichloromethane was purified by reprecipitation from methanol. After the purification and thorough drying, the solution viscosity at 20° C. was measured using dichloromethane as the solvent. The viscosity-average molecular weight $\overline{M}v$ calculated from the measured value was 21000.

The polycarbonate copolymers as prepared above were each provided with a recording film, followed by evaluation of optical recording characteristics. Specifically, the polycarbonate copolymers as described in Examples 1 and 32 were molded into disc-shaped substrates each having a diameter of 130 mm and a thickness of 1.2 mm with an injection press (Dynamelter: a product of Meiki Co., ltd.). A 1,000 Å-thick optical magnetic film was was formed on the substrates thus obtained with an alloy target composed of Tb$_{23.5}$Fe$_{62.2}$Co$_{12.3}$ (atomic %) in a sputtering device (RF sputtering device a product of Nippon Shinku Co.). On the recording film was formed a 1,000 Å-thick protective film composed of inorganic glass as described in Japanese Patent Laid-Open No 177449/1985 which was filed by the applicant of the present application using the same sputtering device as that described above. The performances of the resulting optical magnetic recording discs were evaluated in terms of CN ratio, BER, and change in CN ratio at a temperature of 60° C. and an RH of 90%. The results are shown in Table 1.

TABLE 1

| Sample No. | Birefringence (And single path) | CN(dB) (Note: 1) | BER (bit error rate) | CN ratio after elapse of 30 days (%) (Note: 2) |
|---|---|---|---|---|
| Example 1 | 9 | 53 | $6 \times 10^{-6}$ | 90 |
| Example 2 | 6 | 55 | $2 \times 10^{-6}$ | 95 |
| Comparative example (Note: 3) | 20 | 46 | $5 \times 10^{-5}$ | 85 |
| Example 3 | 7 | 54 | $4 \times 10^{-6}$ | 94 |
| Example 4 | 6 | 55 | $2 \times 10^{-6}$ | 95 |

TABLE 1-continued

| Sample No. | Bi-refringence (Δnd single path) | CN(dB) (Note: 1) | BER (bit error rate) | CN ratio after elapse of 30 days (%) (Note: 2) |
|---|---|---|---|---|
| Example 5 | 8 | 53 | $5 \times 10^{-6}$ | 90 |
| Example 6 | 5 | 55 | $2 \times 10^{-6}$ | 95 |
| Example 7 | 8 | 53 | $5 \times 10^{-6}$ | 90 |
| Example 8 | 7 | 53 | $4 \times 10^{-6}$ | 94 |
| Example 9 | 8 | 53 | $5 \times 10^{-6}$ | 90 |
| Example 10 | 5 | 55 | $2 \times 10^{-6}$ | 95 |
| Example 11 | 9 | 53 | $6 \times 10^{-6}$ | 90 |
| Example 12 | 8 | 53 | $5 \times 10^{-6}$ | 90 |
| Example 13 | 6 | 55 | $2 \times 10^{-6}$ | 95 |
| Example 14 | 7 | 54 | $4 \times 10^{-6}$ | 94 |
| Example 15 | 6 | 55 | $2 \times 10^{-6}$ | 95 |
| Example 16 | 5 | 55 | $2 \times 10^{-6}$ | 95 |
| Example 17 | 5 | 55 | $2 \times 10^{-6}$ | 95 |
| Example 18 | 7 | 54 | $4 \times 10^{-6}$ | 94 |
| Example 19 | 9 | 53 | $6 \times 10^{-6}$ | 90 |
| Example 20 | 6 | 55 | $2 \times 10^{-6}$ | 95 |
| Example 21 | 6 | 55 | $4 \times 10^{-6}$ | 94 |
| Example 22 | 4 | 57 | $2 \times 10^{-6}$ | 95 |
| Example 23 | 9 | 53 | $6 \times 10^{-6}$ | 90 |
| Example 24 | 6 | 55 | $2 \times 10^{-6}$ | 95 |
| Example 25 | 6 | 55 | $4 \times 10^{-6}$ | 94 |
| Example 26 | 4 | 57 | $2 \times 10^{-6}$ | 95 |
| Example 27 | 7 | 54 | $4 \times 10^{-6}$ | 94 |
| Example 28 | 9 | 53 | $6 \times 10^{-6}$ | 90 |
| Example 29 | 8 | 53 | $5 \times 10^{-6}$ | 90 |
| Example 30 | 5 | 55 | $2 \times 10^{-6}$ | 95 |
| Example 31 | 8 | 53 | $5 \times 10^{-6}$ | 90 |
| Example 32 | 6 | 55 | $2 \times 10^{-6}$ | 95 |

(Note)
(1) CN ratio: determined under the following conditions: writing power, 7 mW (milliwatt); reading power, 1mW; frequency of carrier, 1 MHz; resolution band width, 30 KHz.
(2) Change in CN (%): degree of lowering in CN ratio after elapse of 30 days under conditions at a temperature of 60° C and an RH of 90% relative to initial CN ratio.
(3) Comp. Ex.: an optical magnetic disk prepared in the same manner as mentioned above, except that a conventional polycarbonate substrate (AD-5503: a product of Teijin Chemicals Ltd.) was used.

As can be seen from Table 1, the polycarbonate copolymer according to the present invention has a remarkably improved CN ratio by virtue of the lowering in birefringence and is also excellent in durability.

We claim:

1. An optical disk which comprises a substrate of an aromatic polycarbonate obtained by polymerizing one or two monomers polymerized through carbonate linkages and a recording layer coated thereon, said recording layer being capable of having a signal recorded thereon by a laser beam and having a recorded signal read by reflection or transmission of a laser beam, the monomer or monomers being selected from the group consisting of:
(a-1) 1,1'-bis-(4-hydroxyphenyl)-p-diisopropylbenzene
(a-2) 1,1'-bis-(4-hydroxyphenyl)-m-diisopropylbenzene,
(b-1) 2,2-bis-(4-hydroxyphenyl)propane,
(b-2) 2,2-bis-(4-hydroxyphenyl)butane,
(b-3) 2,2-bis-(4-hydroxyphenyl)-4-methylpentane,
(b-4) 2,2-bis-(4-hydroxyphenyl) octane,
(b-5) 1,1-bis-(4-hydroxyphenyl)cyclohexane,
(b-6) 4,4'-dihydroxy-2,2,2-triphenylethane,
(b-7) 2,2-bis-(4-hydroxy-3-methylphenyl)propane,
(b-8) 2,2-bis-(4-hydroxy-3-isopropylphenyl)propane,
(b-9) 2,2-bis-(4-hydroxy-3-sec.-butylphenyl)propane,
(b-10) 2,2-bis-(3,5-dimethyl-4-hydroxyphenyl)propane, the polycarbonate being selected from the group consisting of (I) a copolymer consisting of 3 to 97 mole percent of (a-1) and 97 to 3 mole percent of one of (b-1) to (b-10),
(II) a homopolymer of (a-1) and
(III) a copolymer consisting of 3 to 97 mole percent of (a-2) and 97 to 3 mole percent of one of (b-1), (b-5), (b-6), (b-10) and (a-1).

2. An optical disk as claimed in claim 1, in which the polycarbonate consists of a copolymer of (a-2) and (b-6).

3. An optical information recording disk comprising a substrate consisting of an aromatic polycarbonate synthetic resin and a recording layer coated on said substrate, said recording layer being capable of having a signal recorded thereon by a laser beam and having a recorded signal read by reflection or transmission of a laser beam, said aromatic polycarbonate synthetic resin consisting of a homopolymer of 1,1'-bis-(4-hydroxyphenyl)-p-diisopropylbenzene.

4. An optical information recording disk comprising a substrate of an aromatic polycarbonate synthetic resin and a recording layer coated on said substrate, said recording layer being capable of having a signal recorded thereon by a laser beam and having a recorded signal read by reflection or transmission of a laser beam, said aromatic polycarbonate synthetic resin being a copolymer consisting of (1) from 3 to 97 mole percent of 1,1'-bis-(4-hydroxyphenyl)-p-diisopropylbenzene and (2) from 97 to 3 mole percent of monomer selected from the group consisting of 2,2-bis-(4-hydroxyphenyl)propane, 2,2-bis-(4-hydroxyphenyl)butane, 2,2-bis-(4-hydroxyphenyl)propane, 2,2-bis-(4-hydroxyphenyl)butane, 2,2-bis-(4-hydroxyphenyl)-4-methylpentane, 2,2-bis-(4-hydroxyphenyl)octane, 1,1-bis-(4-hydroxyphenyl)cyclohexane, 4,4'-dihydroxy-2,2,2-triphenylethane, 2,2-bis-(4-hydroxy-3-methylphenyl)propane, 2,2-bis-(4-hydroxy-3-isopropylphenyl)propane, 2,2-bis-(4-hydroxy-3-sec.-butylphenyl)propane, and 2,2-bis-(3,5-dimethyl-4-hydroxyphenyl)propane.

5. An optical information recording disk as claimed in claim 4, in which said monomer (2) is selected from the group consisting of 2,2-bis-(4-hydroxyphenyl)propane, 2,2-bis-(4-hydroxyphenyl)butane, 2,2-bis-(4-hydroxyphenyl)-4-methylpentane, 2,2-bis-(4-hydroxyphenyl)octane, 1,1-bis-(4-hydroxyphenyl)cyclohexane, and 4,4'-dihydroxy-2,2,2-triphenylethane.

6. An optical information recording disk comprising a substrate of an aromatic polycarbonate synthetic resin and a recording layer coated on said substrate, said recording layer being capable of having a signal recorded thereon by a laser beam and having a recorded signal read by reflection or transmission of a laser beam, said aromatic polycarbonate synthetic resin being a copolymer consisting of (1) from 3 to 97 mole percent of 1,1'-bis-4(-hydroxyphenyl)-m-diisopropylbenzene and (2) from 97 to 3 mole percent of monomer selected from the group consisting of 2,2-bis-(4-hydroxyphenyl)propane, 1,1-bis-(4-hydroxyphenyl)cyclohexane, 4,4'-dihydroxy-2,2,2-triphenylethane, 2,2-bis-(3,5-dimethyl-4-hydroxyphenyl)propane, and 1,1'-bis-(4-hydroxyphenyl)-p-diisopropylbenzene.

7. An optical information recording disk as claimed in claim 6, in which said monomer (2) is selected from the group consisting of 2,2-bis-(4-hydroxyphenyl)propane, 1,1-bis-(4-hydroxyphenyl)cyclohexane, and 4,4'-dihydroxy-2,2,2-triphenylethane.

* * * * *

UNITED STATES PATENT AND TRADEMARK OFFICE
CERTIFICATE OF CORRECTION

PATENT NO. : 4,978,578

DATED : December 18, 1990

INVENTOR(S) : Tatsuya Kanno, et al.

It is certified that error appears in the above-identified patent and that said Letters Patent is hereby corrected as shown below:

Column 22, lines 32 and 33; delete "propane, 2,2-bis(4-hydroxyphenyl)butane, 2,2-bis-(4-hydroxyphenyl)".

Signed and Sealed this

Twenty-seventh Day of October, 1992

Attest:

DOUGLAS B. COMER

*Attesting Officer*     *Acting Commissioner of Patents and Trademarks*